United States Patent
Siragusa et al.

(10) Patent No.: US 8,829,980 B2
(45) Date of Patent: Sep. 9, 2014

(54) PHASED-ARRAY CHARGE PUMP SUPPLY

(75) Inventors: Eric Siragusa, San Diego, CA (US); Franklin Murden, Roan Mountain, TN (US); Jonathan Audy, Los Gatos, CA (US)

(73) Assignee: Analog Devices, Inc., Norwood, MA (US)

( * ) Notice: Subject to any disclaimer, the term of this patent is extended or adjusted under 35 U.S.C. 154(b) by 238 days.

(21) Appl. No.: 13/214,904

(22) Filed: Aug. 22, 2011

(65) Prior Publication Data

US 2012/0242401 A1 Sep. 27, 2012

Related U.S. Application Data

(60) Provisional application No. 61/454,744, filed on Mar. 21, 2011.

(51) Int. Cl.
  *G05F 1/10* (2006.01)
  *G05F 3/02* (2006.01)
  *H02M 3/07* (2006.01)

(52) U.S. Cl.
  CPC ..................................... *H02M 3/073* (2013.01)
  USPC ........................................................ 327/536

(58) Field of Classification Search
  USPC ........................................................ 327/536
  See application file for complete search history.

(56) References Cited

U.S. PATENT DOCUMENTS

| | | | |
|---|---|---|---|
| 5,642,073 A | 6/1997 | Manning | |
| 5,680,300 A | 10/1997 | Szepesi et al. | |
| 5,959,854 A * | 9/1999 | Okada | 363/60 |
| 7,151,413 B2 | 12/2006 | Lin | |
| 7,567,118 B2 * | 7/2009 | Azuma et al. | 327/536 |
| 7,737,765 B2 * | 6/2010 | Tran et al. | 327/536 |
| 8,508,287 B2 * | 8/2013 | Kern et al. | 327/536 |
| 2002/0171496 A1 | 11/2002 | Jordan et al. | |
| 2004/0051579 A1 * | 3/2004 | Hausmann et al. | 327/536 |
| 2005/0046498 A1 | 3/2005 | Nishiyama | |
| 2010/0013548 A1 | 1/2010 | Barrow | |
| 2010/0052771 A1 * | 3/2010 | Hartono | 327/536 |
| 2010/0166229 A1 | 7/2010 | Pennock et al. | |

OTHER PUBLICATIONS

International Search Report and Written Opinion of the International Searching Authority in counterpart International application No. PCT/US2012/029915, communication dated Jul. 9, 2012.

Dongsheng Ma, "Robust Multiple-Phase Switched-Capacitor DC-DC Converter with Digital Interleaving Regulation Scheme," Proceedings of the 2006 International Symposium on Low Power Electronics and Design, pp. 400-405, ISLPED'06, Oct. 4-6, 2006.

* cited by examiner

*Primary Examiner* — Lincoln Donovan
*Assistant Examiner* — Colleen O Toole
(74) *Attorney, Agent, or Firm* — Kenyon & Kenyon LLP

(57) ABSTRACT

A charge pump system and method that may provide large supply voltages and currents with reduced ripple voltage at reduced ripple frequency. The charge pump system may include an array of charge pumps and a delay pipeline. The array of charge pumps may include a plurality of charge pumps. The delay pipeline may include a plurality of delay elements. The delay elements may respond to a global trigger signal to output a trigger signal to the array of charge pumps. Respective charge pumps may fire in response to the trigger signal.

2 Claims, 4 Drawing Sheets

200

300

400

PHASED-ARRAY CHARGE PUMP SUPPLY

PRIORITY

This application claims the benefit of U.S. Provisional Application Ser. No. 61/454,744 filed on Mar. 21, 2011, the entire contents of which are incorporated herein by reference.

FIELD

Charge pumps are well known devices. In integrated circuit (IC) implementations, components on the IC may have voltage or current requirements that differ from supply voltage or current sources supplied to the IC. Charge pumps may be used to convert the supplied current or voltage to a different voltage or current from the IC supply voltage. This is beneficial because it reduces customer cost, and power requirements for the IC. Charge pumps can be used to create supplies greater or less than the supply voltage or negative supplies generated from positive supply voltages.

BACKGROUND

However, at times a large voltage or current value may be required for a particular application. This is typically accomplished using a large capacitor or inductor external to the IC. Commonly, as the voltage and current outputs rise, the respective noise also rises. In addition, as loads to the IC change, the voltage droop may become excessive due to the large voltages and/or currents being provided. Alternatively, fluctuation, or more commonly, "ripple", in the output current or voltage value may be significant. If the ripple is significant, it can cause errors in the loads supplied with the output voltages or currents. The rate of change of the ripple voltage is the ripple frequency.

One known method of reducing voltage or current ripple is to interleave a number of charge pumps. The number of charge pumps maintains the output voltage or current supply as each charge pump discharges and recharges according to a clock signal. Interleaving requires a number of clock signals to control the firing of the number of charge pumps. The firing of the number of charge pumps may actually increase the voltage ripple as each individual charge pump fires imprecisely due to failure to synchronize the number of clock signals. The management of the number of different clock signals requires a complex control device. Furthermore, the additional clock inputs and related connections also consume additional real estate on the IC, which increases cost as well as makes for a larger IC. Also, interleaving may not provide a large voltage or current that may be needed by a particular circuit application or configuration.

Accordingly, there is a need for a charge pump configuration that supplies large voltage or current without the complex control and multitude of inputs of an interleaved solution.

DETAILED DESCRIPTION

A charge pump system may include a plurality of charge pumps connected in an array, and a plurality of delay elements also connected in an array. A respective one of the delay elements connected to an enabling input of a respective one of the plurality of charge pumps. The respective delay elements may be supplied with a trigger signal according to which the charge pumps may be enabled to fire in a cascaded manner after some time delay to separately output a voltage to a common output connection of the plurality of charge pumps. The trigger signal supplied to the delay elements may be a single one-time input signal, or a single clock signal. The trigger signal may repeat only after all of the charge pumps have provided an output signal.

Figure 1:
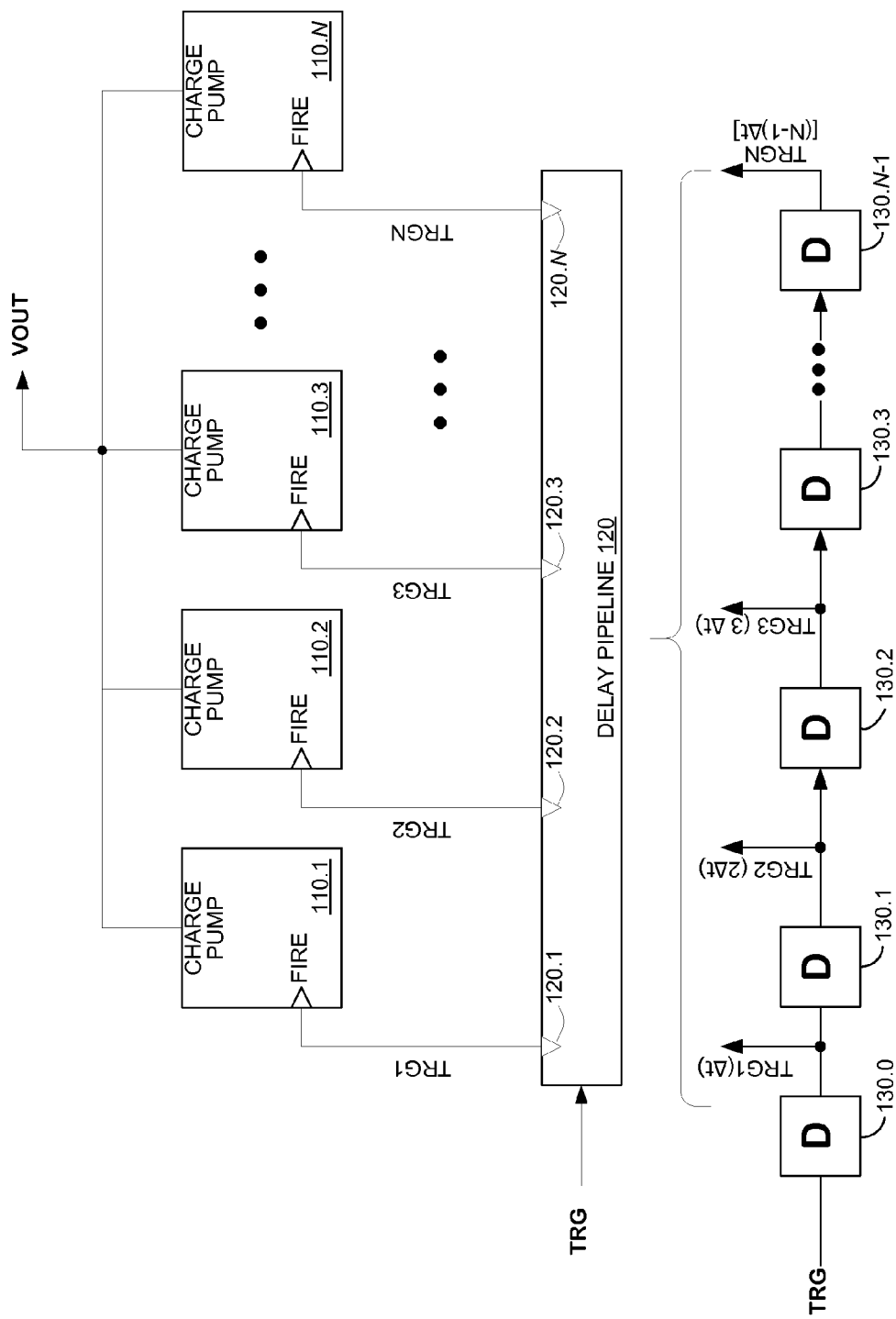
FIG. 1 illustrates a block diagram of an exemplary charge pump system according to an embodiment of the present invention.

FIG. 1 is a block diagram of a charge pump system according to an embodiment of the present invention. The charge pump system 100 may include a plurality of charge pumps 110.1 to 110.N, a delay pipeline 120 and an input signal, which may be a trigger signal TRG. The charge pumps 110.1 to 110.N may have outputs connected in parallel, and may generate a voltage and/or current signal to a load.

The delay pipeline 120 may have an input to receive the trigger signal TRG. The trigger signal TRG may be a periodic clock signal, a single impulse signal (e.g., a "one-shot"), or any form of signal suitable to initiate the firing of the charge pumps 110.1 to 110.N. The delay pipeline 120 may include a plurality of outputs 120.1 to 120.N for outputting a firing signal output from respective delay elements 130.0 to 130.N−1 to each of the respective charge pumps 110.1 to 110.N. For example, the delay elements 130.0 to 130.N−1 may be connected in series to provide incremented delay to the input global trigger signal TRG. As a result, the delayed trigger signal (e.g., TRG1, TRG2 . . . ) may be offset from each other by a time period ($\Delta t$). The charge pumps 110.1 to 110.N may be characterized by a decay time that is longer than a delay time of the delay elements 130.0 to 130.N−1. In other words, the output voltage or current may overlap for a time period from each charge pump 110.1 to 110.N as each charge pump fires. As a result, the output voltage or current may remain substantially constant.

The delay elements 130.0 to 130.N may be implemented using inverters, switches, delay lines or other circuit components (e.g., RC delay). For example, a single inverter has an inherent delay in the transistor switching of the inverter; the delay elements 130.0-130.N−1 each may be made of one or more inverters. When the system 100 is fabricated as an integrated chip, the inverters will share common circuit characteristics, and hence a similar time delay.

The delay elements 130.0 to 130.N−1 may be configured either in an open loop configuration as shown, or as a ring oscillator. The cascaded delay elements 130.0 to 130.N−1 may be arranged, for example, individually in series, or in groups of delay elements. Each delay element 130.0 to 130.N−1 may provide the same delay period of $\Delta t$.

During operation, the global trigger signal TRG may be applied to the input to the delay pipeline 120. In response to the application of global trigger signal TRG, a trigger signal TRG1 may be output from delay element 130.0 of the delay pipeline 120 via the output 120.1. After a predetermined delay ($\Delta t$) due to delay element 130.0, the timing signal TRG1 may cause the first charge pump 110.1 to fire, and output a signal $V_{OUT}$. The timing signal TRG1 may be applied to delay element 130.1, and, after a predetermined delay ($\Delta t$), output a trigger signal TRG2 from the output 120.2 of the delay pipeline 120. The trigger signal TRG2 may now be delayed a time period of 2Δt from the initial application of the global trigger signal TRG to the delay pipeline 120. The output 120.2 may provide the output trigger signal TRG2 to the charge pump 110.2 and to delay element 130.2. The charge pump 110.2 may fire in response to the trigger signal TRG2, and output a signal $V_{OUT}$. The delay element 130.2 may also respond to the output signal from delay element 130.1 and after an inherent delay, output a trigger signal TRG3 via delay pipeline output 120.3 to the charge pump 110.3 and to delay element 130.3. As a result, charge pump 110.3 may fire and output a signal $V_{OUT}$, and delay element 130.3 may output a trigger signal after a delay an output signal. This process may continue until delay element 130.N−1 outputs delayed signal TRGN, which is output from delay pipeline output 120.N to charge pump 110.N. The charge pump 110.N may fire in response to the trigger signal TRGN, and output a signal $V_{OUT}$.

Operation of the charge pump system 100 may be arranged such that all of the charge pumps 110.1 to 110.N fire within one clock cycle, or some other predetermined period of time. In certain embodiments, the charge pumps 110.1 to 110.N may be characterized by a decay time that is longer than a delay time of the delay elements 130.1-130N−1. With this configuration and timing for the firing of each respective charge pump, a voltage, or current, of sufficient magnitude can be supplied to the load with minimal ripple and substantially no droop. If the delay elements 130.1 to 130.N−1 are arranged in a ring oscillator configuration, the above sequence may repeat until interrupted by another control signal, for example.

In certain situations, the delay elements and charge pumps may not provide consistent performance from one delay element to the next, or one charge pump to the next for various reasons. If the non-consistent performance occurs at a regular interval, it may generate an error that may be propagated upstream, and may, perhaps, be amplified. As a result, errors may occur at the output of the charge pump system. Different techniques may be applied to mitigate the potential for these types of errors to occur. For example, a first technique may be to randomize the selection a respective charge pump to be fired, and a second may be to randomize the delay applied to the firing signals applied to respective charge pumps.

Figure 2:
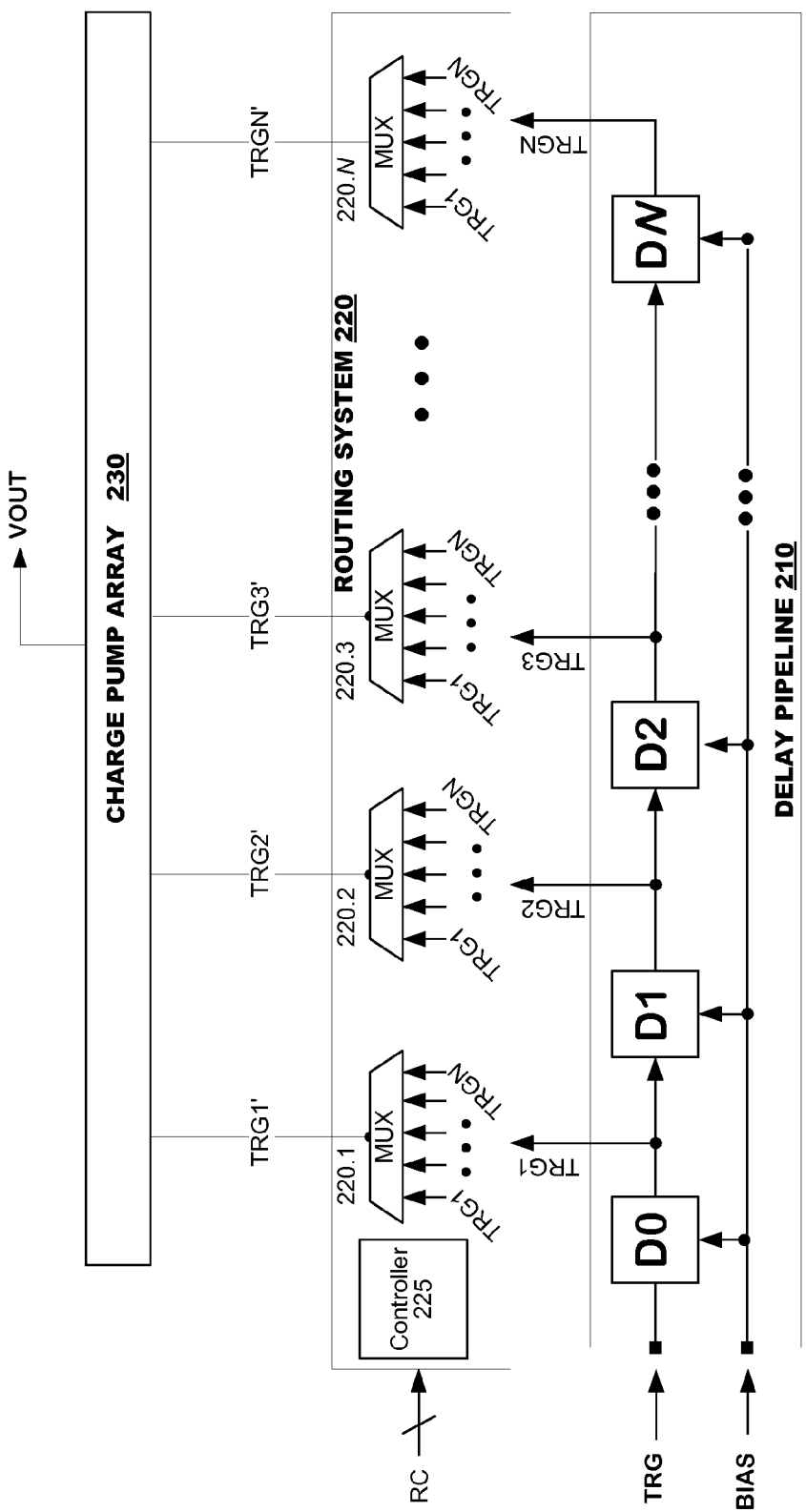
FIG. 2 illustrates a charge pump system for randomized firing of charge pumps in a charge pump array according to an embodiment of the present invention.

In the embodiment illustrated in FIG. 2, the firing of the charge pumps in a charge pump array 230 may be randomized by randomly selecting which charge pump to fire. The phased array charge pump system 200 may include a delay pipeline 210, a routing system 220, and a charge pump array 230. The delay pipeline 210 may include a plurality of delay elements D0-DN, inputs for a trigger signal TRG and a delay bias signal BIAS, and outputs for delayed trigger signals TRG1-TRGN. The delay bias signal BIAS may be used to adjust the delay of the delay elements D0-DN in the delay pipeline 210. The routing system 220 may include a plurality of multiplexors (MUX) 220.1-220.N, an input for a routing control signal RC, a plurality of inputs to receive delayed trigger signals output from the delay pipeline 210, and a plurality of outputs to pass the delayed trigger signals TRG1' to TRGN' to a charge pump within the charge pump array 230.

The delay pipeline 210 may include inputs for a timing signal TRG and a bias signal BIAS. The timing signal TRG may begin the firing sequence for the charge pump array 230. The bias signal BIAS may be applied to the delay elements D0-DN to adjust the delay of each delay element D0-DN. For example, the bias signal BIAS may be applied to a back gate of transistor used in an inverter implementation of the delay element D0-DN. Although shown as a single delay signal, each delay element D0-DN could have an individual bias signal applied to it. The choice of a particular bias level may be randomized. The delay pipeline 210 may be coupled to routing system 220. Routing system 220 may have inputs for signals TRG1-TRGN output from the delay pipeline 210, and an input for a routing control signal RC. The routing system 220 may be coupled to the charge pump array 230. The routing system 220 may be configured to change the firing of the respective charge pumps from cycle to cycle to provide better error mitigation.

In response to the TRG signal, the delay pipeline 210 may sequentially generate trigger signals TRG1-TRGN that are input to the routing system 220. The routing system 220 may include a controller 225, an input of a routing control RC signal, a plurality of inputs from the delay pipeline 210, a plurality of outputs to the charge pump array 230, logic devices 220.1-220.N, which may be multiplexers. The routing control signal RC may be a digital code word. The controller 225 may interpret the digital code word and, based on the interpretation, route a trigger signal (e.g., TRG1) to a respective charge pump in the charge pump array 230.

For example with reference to FIG. 2, the trigger signal TRG may be applied to the delay pipeline 210. The delay element D0 may apply a first delay, and output a delayed trigger signal TRG1 to the routing system 220 and to delay element D1. The routing control signal RC may be applied to routing system 220, and received by the controller 225. Based on the interpretation of the routing control signal RC, the controller 225 may signal MUX 220.3 to pass delayed trigger signal TRG1 and output randomized trigger signal TRG3' to a charge pump (not shown) connected to MUX 220.3 in charge pump 230. Similarly, the delayed trigger signal TRG2 output from delay element D1 may passed by MUX 220.1, which outputs randomized trigger signal TRG1'.

The routing control signal RC may be provided by an external or internal controller, and may change so charge pumps within the charge pump array 230 may fire sequentially or non-sequentially (i.e., randomized) to provide either a voltage or current signal.

Figure 3:
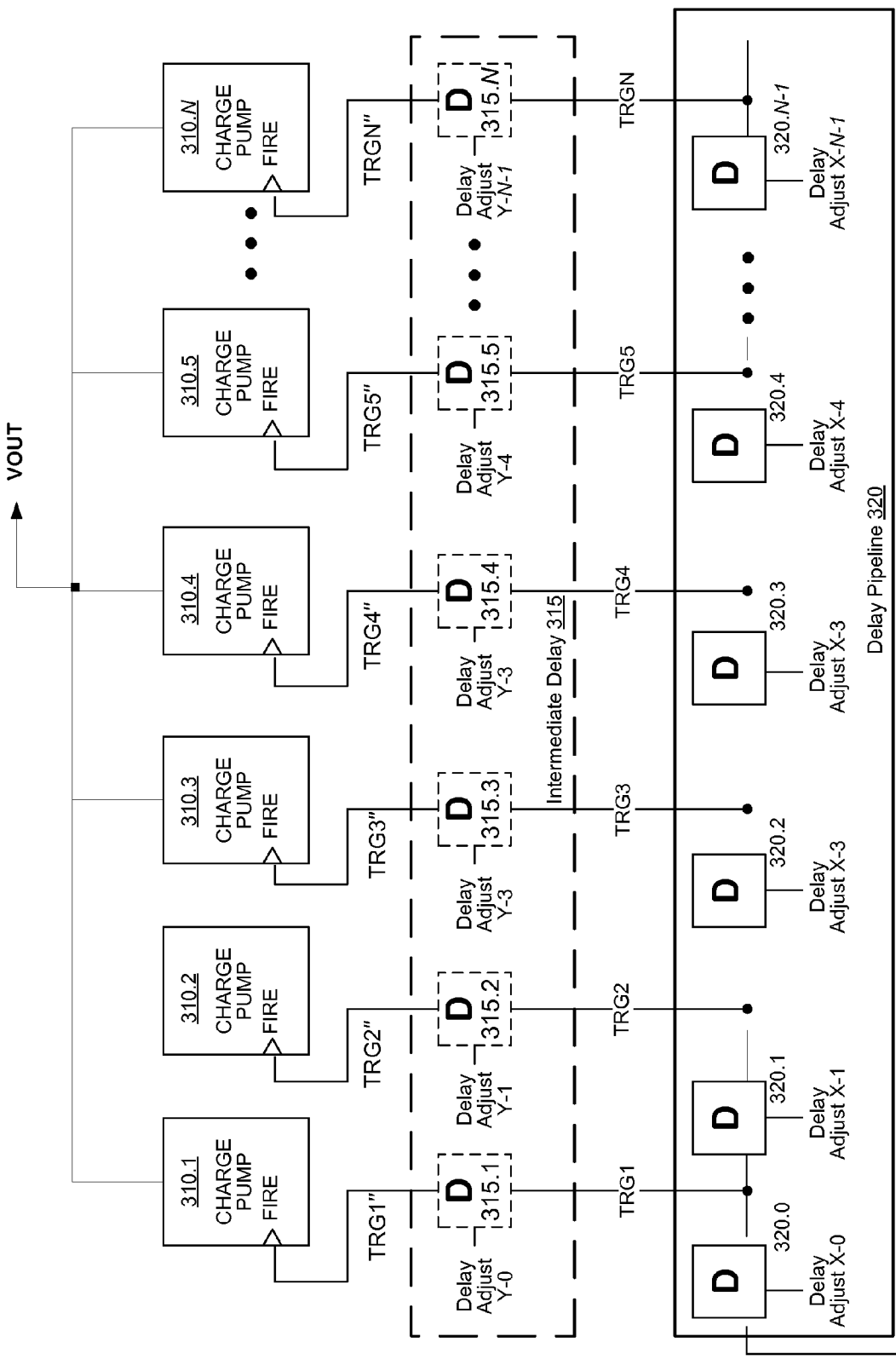
FIG. 3 illustrates a charge pump system for randomizing delays in supplying firing signals to charge pumps according to an embodiment of the present invention.

FIG. 3 shows a charge pump system that mitigates the potential for propagating signal errors according to another embodiment of the present invention. In the illustrated example, the delay of the firing of each of the individual charge pumps in a charge pump array may be randomized from cycle to cycle, thereby randomizing the effects of signal errors. The charge pump system 300 may include an array of charge pumps 310.1-310.N, intermediate delay element 315 and a delay pipeline 320.

The cascaded delay elements 320.0-320.N−1 may provide a delayed trigger signal from one delay element to the next. The time delay of each delay element 320.0-320.N may be the same, or may be adjusted by application of a delay adjust signal, such as delay adjust X-0 to delay adjust X-N−1. Each delay element 320.0-320.N−1 may have an individual delay adjustment that allows the delay for each delay element to be individually set. For example, in an implementation in which the delay elements 320.0-320.N−1 are implemented using inverters, the delay of delay element 320.0 may be adjusted by applying the delay adjust X-0 signal to a back gate of a transistor in the inverter of delay element 320.0. Alternatively, in a delay line implementation, the delay adjust X-0 signal may actuate a switch that adds or deletes additional delay line segments to the overall delay line. As shown, each delay element 320.0-320.N−1 may have an individual delay adjust X-0—delay adjust X-N−1. The delay elements 320.0-320.N−1 may be implemented using inverters, delay lines or RC circuits.

The trigger signal TRG1-TRGN output from delay pipeline 320 may be input to intermediate delay 315, which may be coupled to the delay pipeline 320 and to respective charge pumps 310.1 to 310.N. The intermediate delay 315 may include delay elements 315.1 to 315.N. The delay elements 315.1 to 315.N may be implemented using inverters, delay lines or RC circuits. Similar to the delay elements 320.0-320.N−1, each of the delay elements 315.1 to 315.N may also have individual delay adjustments, such as delay adjust Y-0 to delay adjust Y-N−1.

In operation, the global trigger signal TRG may be applied to the delay pipeline 320. The delay element 320.0 may delay the global trigger signal TRG for a predetermined time delay based the delay element's 320.0 preset delay including any adjustment (increase or reduction) to the delay in response to the delay adjust X-0 signal. After the predetermined time delay, the delay element 320.0 may output a delayed trigger signal TRG1 to intermediate delay 315 and to delay element 320.1. The delayed trigger signal TRG1 may be received at an input to intermediate delay element 315.1 of the intermediate delay 315. After a preset delay (which may be individually adjusted by the delay adjust Y-1 signal), the intermediate delay element 315.1 may output a delayed trigger signal TRG1" for firing the charge pump 310.1. In response to receiving the delayed trigger signal TRG1", the charge pump 310.1 may fire and output a voltage/current signal VOUT. The voltage/current signal VOUT may be provided to a load. With respect to the delayed trigger signal TRG1 applied to delay element 330.1, delay element 330.1 may further delay trigger signal TRG1 for a predetermined time period including any delay adjustment in response to the delay adjust X-1 signal. Delay element 330.1 may output a delayed trigger signal TRG2 to the intermediate delay 315 and to delay element 330.2. The delayed trigger signal TRG2 applied to intermediate delay 315 may be input to intermediate delay element 315.2. Intermediate delay element 315.2 may delay outputting a trigger signal to charge pump 310.2 in response to its set delay including any adjustment (increase or reduction) to the delay in response to the delay adjust Y-1 signal. After the predetermined time period, the intermediate delay element 315.2 may output a delayed trigger signal TRG2" for firing the charge pump 310.2. This process may continue for the firing of charge pumps 310.3-310.N that may have delayed trigger signals TRG3"-TRGN" applied to them.

The individual delay adjustments delay adjust Y-0 to delay adjust Y-N−1 signals may set the individual delays of the intermediate delay elements 315.1-315.N. For example, the delay elements 315.1-315.N may be implemented using transistors configured as inverters, and the respective delay adjust signal may be applied to a back gate of the respective transistors thereby effecting operation of the inverter and the inverter's delay. The plurality of different combinations of delay adjustment of the delay elements 320.0-320.N−1 in the delay pipeline 320 with the delay adjustment of the delay elements 315.1-315.N of the intermediate delay 315 provide numerous possibilities for overcoming the effects of erroneous signals in the signal chain.

Figure 4:
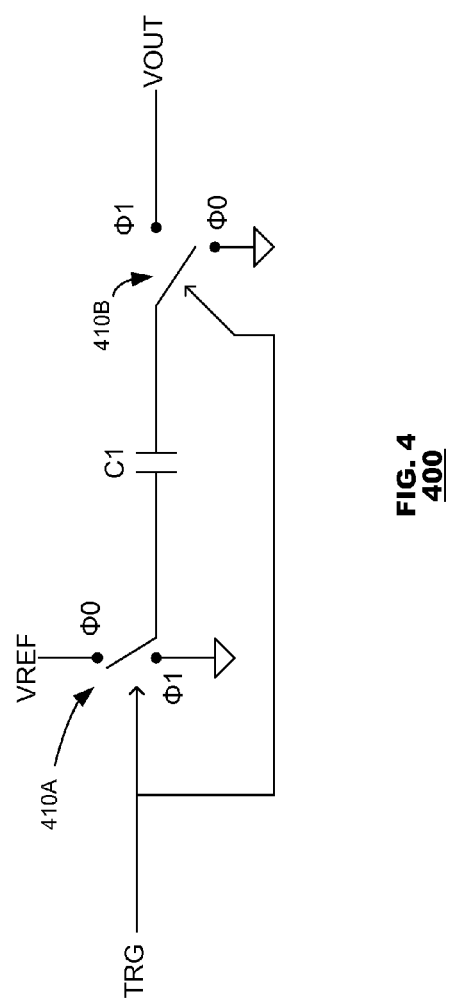
FIG. 4 illustrates an exemplary charge pump for implementing an embodiment of the present invention.

FIG. 4 illustrates an exemplary schematic diagram of a negative charge pump. A positive charge pump can be created by reconfiguring the switches and how they connect to VREF. The charge pump 400 may be used as one of the plurality of charge pumps as described with respect to FIGS. 1-3. The charge pump 400 may include a pair of switches 410A and 410B, a capacitor C1, an input for a control signal TRG, an input for reference voltage VREF, and an output for the output voltage VOUT. The charge pump 400 may be in a recharge state when control signal TRG is LOW, and switches 410A and 410B are connected to position $\phi 0$. Switch 410A may be connected to reference voltage VREF and switch 410B may be connected to a lower potential, or ground. As a result, capacitor C1 may begin to charge to a voltage approximately equal to VREF. When the control signal TRG goes HIGH in response to an output from the respective delay elements, or routing logic, switches 410A and 410B are placed in a second position $\phi 1$. As a result, switch 410A is connected to lower potential terminal, or ground, and switch 410B is connected to the output VOUT. The capacitor C1 discharges and outputs voltage/current signal VOUT. Once the control signal TRG is no longer asserted and goes LOW, the switch 410A may re-connect to VREF and switch 41013 may re-connect to low potential, or ground, and capacitor C1 may recharge. An inverter may be applied before control signal TRG to invert the sequence of operation.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure.

We claim:

1. A charge pump system, comprising:
    a plurality of charge pumps each having an output connected to a common node and having an input for a trigger signal,
    a chain of delay elements, a first delay element having an input for a global trigger signal, each delay element to impose an incremental delay on the propagation of the trigger signal as it progresses through the chain;
    a routing system coupled between the charge pumps and the chain of delay elements to randomly route the trigger signal from an output of respective delay elements to inputs of the charge pumps according to a control signal, wherein the routing system comprises a plurality of multiplexors, each multiplexor coupled to all outputs of the chain of delay elements and having an output coupled to a corresponding one of the plurality of charge pumps.

2. The charge pump system of claim 1, wherein the routing control signal signals which multiplexor is to pass the trigger signal received from one of the outputs of the chain of delay elements to the corresponding one of the plurality of charge pumps.

* * * * *